United States Patent [19]

Zaelke

[11] Patent Number: 4,478,781
[45] Date of Patent: Oct. 23, 1984

[54] METHOD AND APPARATUS FOR REFURBISHMENT OF PLASTIC CONTAINERS

[76] Inventor: Arnold E. Zaelke, 10132 San Luis, Southgate, Calif. 90280

[21] Appl. No.: 412,912

[22] Filed: Aug. 30, 1982

[51] Int. Cl.³ .............................................. B29C 25/00
[52] U.S. Cl. ..................................... 264/341; 264/83; 264/237; 264/345
[58] Field of Search .................. 264/83, 235, 237, 341, 264/343, 345, 346, 348

[56] References Cited

U.S. PATENT DOCUMENTS

| | | | |
|---|---|---|---|
| 3,327,033 | 6/1967 | Koch et al. | 264/341 |
| 3,541,200 | 11/1970 | Niegisch | 264/343 |
| 3,546,331 | 12/1970 | Niegisch | 264/343 |
| 3,808,301 | 4/1974 | Pruden | 264/345 |
| 3,886,253 | 5/1975 | Friendship | 264/346 |
| 3,971,173 | 7/1976 | Friendship | 264/346 |
| 4,342,718 | 8/1982 | Caratsch | 264/345 |

FOREIGN PATENT DOCUMENTS 685140  4/1964  Canada .

Primary Examiner—Paul Lieberman
Assistant Examiner—Willie Thompson
Attorney, Agent, or Firm—Fulwider, Patton, Rieber, Lee & Utecht

[57] ABSTRACT

Polycarbonate water bottles are refurbished by automated cycling through conveyor system having a loading and unloading section, a temperature adjusting section, a vapor exposure section, and a cooling and curing section. Each of the sections are associated in a continuous circuit by means of a conveyor system which conveys a plurality of bottles through the refurbishing system. Each bottle is first heated to not less than 103° F. and then cooled to a predetermined state wherein the thinner portions of each bottle are at a temperature in the range of 75°-80° F. and the thicker portions are at a temperature in the range of 90°-95° F. Each bottle is then subjected to a dichloromethane vapor cloud for at least 10 seconds, during which time the skin layer becomes fluidic and the surface tension causes all blemishes and scratches to be removed. The bottle is then cooled, hardened and degassed during its return trip through the cooling and curing section, after which it is unloaded and is ready for refilling.

13 Claims, 7 Drawing Figures

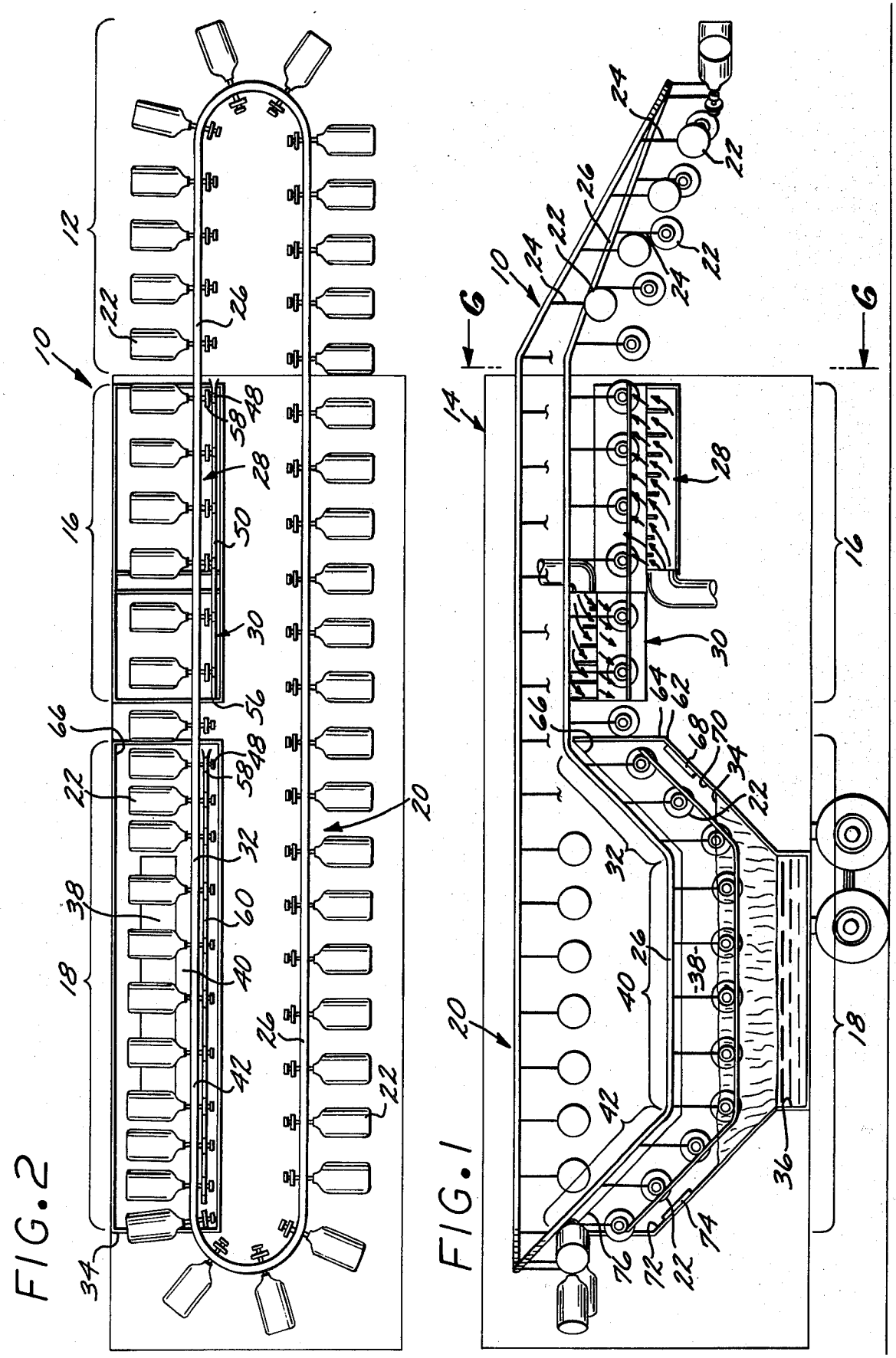

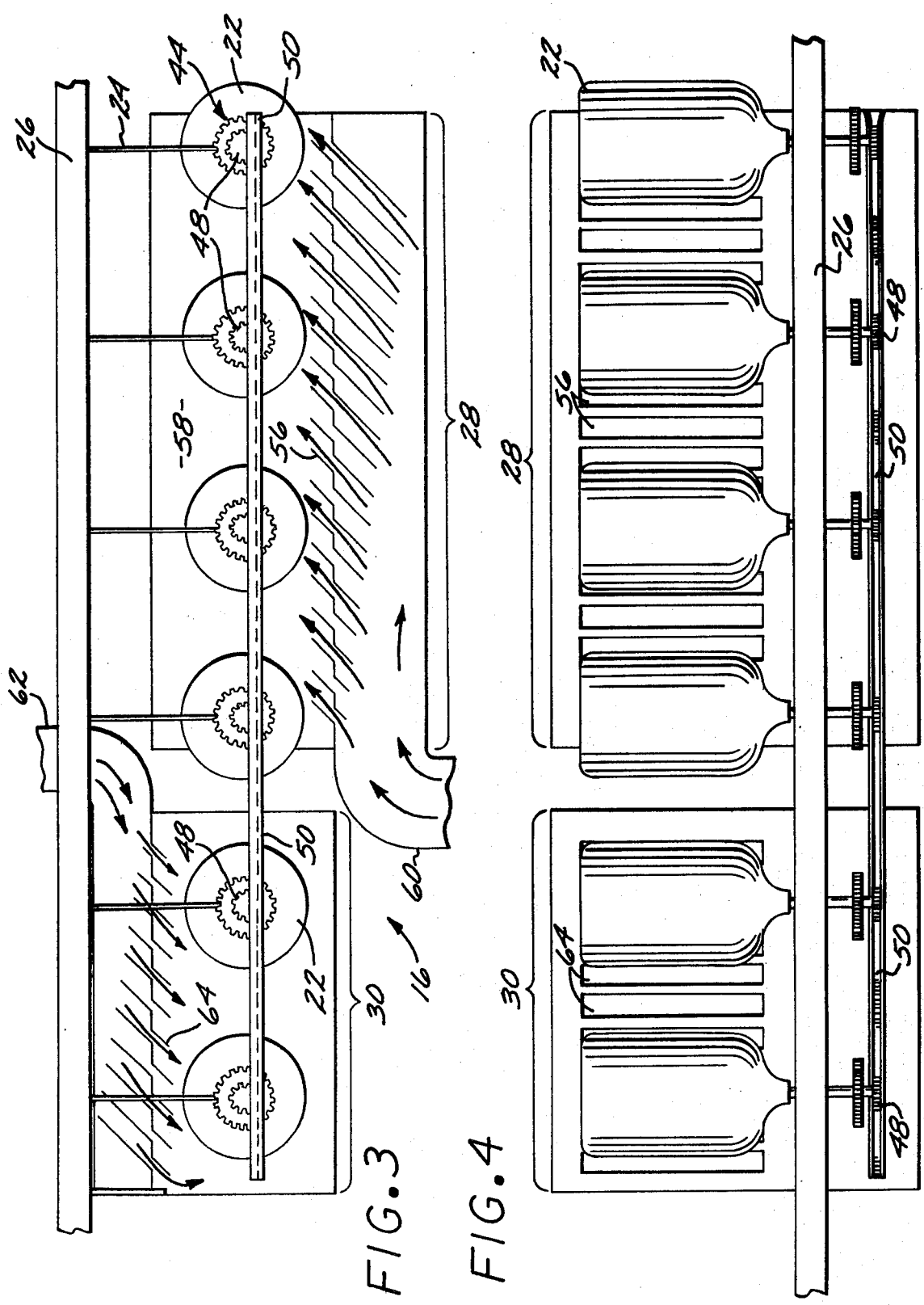

METHOD AND APPARATUS FOR REFURBISHMENT OF PLASTIC CONTAINERS

BACKGROUND OF THE INVENTION

1. Field of the Invention

The present invention relates to the field recycling and refurbishing of plastic containers and more particularly relates to a method and apparatus for removing blemishes from polycarbonate water bottles.

2. Description of the Prior Art

Bottled water, which is widely used thoughout many parts of the country and world where tap water is either unpalatable or not reliably potable, has traditionally been delivered and stored for consumer use in large five gallon glass bottles. Although durable, such glass bottles are very expensive to manufacture, heavy to handle, and susceptible to breakage. More recently, glass water bottles have been increasingly replaced by five gallon plastic water bottles, and in particular, polycarbonate water bottles. The polycarbonate water bottles have the advantage of not only being more inexpensively produced, but of being substantially lighter and virtually unbreakable.

However, despite the extreme ruggedness of such plastic bottles, the material of such bottles is particularly susceptible to scuffing, abrasion, and scratching. Even though the plastic bottles are less expensive than the glass bottles that preceded them, their cost is not so trivial that they are disposable. Consequently, as with glass bottles, plastic water bottles are returned, sanitized and recycled a number of times.

During filling, washing, transporting and other normal handling operations, the exterior of the plastic bottles becomes scuffed and scratched. These surface blemishes are accumlated during repeated handling to the point that the plastic bottle acquires a scratched or cloudy appearance, thereby tending to give the illusion that the water contained within the bottle is similarly clouded by contaminants. At this point, continued used of the bottle becomes commercially unacceptable, and it must be discarded, despite the fact that the bottle actually has a substantial usable lifetime remaining.

What is need, then, is a method and apparatus to remove scuff marks and other scratches from the exterior of plastic containers without affecting the strength, surface hardness, or inert properties of the interior of the container which is in intimate contact with a consumable substance or liquid.

BRIEF SUMMARY OF THE INVENTION

The present invention is a method of removing blemishes from plastic containers, comprising the steps of heating the plastic containers to a predetermined temperature to maximize interaction of a solvent which is specific to the material of the plastic containers. The plastic containers are then evenly exposed to a bath of vapors of the solvent. During this exposure step, the plastic containers are characterized by a predetermined temperature pattern achieved during the prior step of heating. After exposure to the bath of solvent vapors, the containers are removed from the vapor bath and allowed to cool in absence of the vapors. By reason of this combination of steps, a skin layer of the plastic container is softened and allowed to flow. During the steps of removing and cooling the containers, the solvent dissipates from the surface and the container hardens with a smooth, blemish-free exterior surface.

In particular, the method of the present invention is a method for removing blemishes from a polycarbonate water bottle by controlled exposure at a predetermined temperature to a vapor bath of dichloromethane. More specifically, the bottles are heated to a temperature in excess of 103° F., and then subjected to a flow of cooling air so that the thinnest portions of each bottle are aproximately 75°-80° F., with the thickest portions of the same bottle being approximately 90°-95° F. The bottle is then subjected to the vapor bath for at least 10 seconds, during which time the bottle is rotated in a horizontal position by means of a fixture which also seals the interior of the bottle from the vapor bath.

The invention also includes an apparatus for the automated implementation of the above described method, including a loading and unloading section in which the bottles are attached to sealing fixtures which hold the bottles in a horizontal position and which translate them through the automated system on a hanging conveyor. The bottles are loaded in the loading section and then transverse a heating chamber, during which time they are rotated in the horizontal position and subjected to a temperature controlled to heat the bottle to not less than 103° F. The bottles leave the heating chamber and enter a cooling chamber. During the traverse of the cooling chamber, the bottles are subjected to a flow of cooling air, which cools the thinnest portions of the bottle to 75°-80° F. and the thicker portions to 90°-95° F. The bottles then leave the cooling chamber and enter a vapor chamber, where they continue to be maintained in their horizontal position, and where they are subjected for at least 10 seconds to a standing bath of dichloromethane vapors. The vapors penetrate the skin layer of the bottle, causing it to turn into a liquid or semiliquid state. The inherent surface tension of the liquid-like skin layer tends to remove all scratches and blemishes from the surface of the bottle. The bottle is then removed from the vapor chamber and is returned through a cooling and curing section to the unloading section. During their traverse through the cooling and curing section, the bottles are kept free from contact with any other object by means of their corresponding fixtures. When they emerge from the curing section, the bottles are clear, hardened and blemish-free.

The present invention, in its various embodiments, can better be understood by viewing the following figures, wherein like elements are referenced by like numerals.

BRIEF DESCRIPTION OF THE DRAWINGS

FIG. 1 is a cutaway, diagrammatic side view of a mobile conveyor system for treating polycarbonate bottles according to the present invention.

FIG. 2 is a cutaway, diagrammatic plan view of the conveyor system of FIG. 1.

FIG. 3 is a cutaway, diagrammatic side view, in enlarged scale, of the temperature chambers of the conveyor system illustrated in FIGS. 1 and 2.

FIG. 4 is a cutaway, diagrammatic top view of the temperature chambers shown in FIG. 4.

DETAILED DESCRIPTION OF THE PREFERRED EMBODIMENTS

Figure 6:
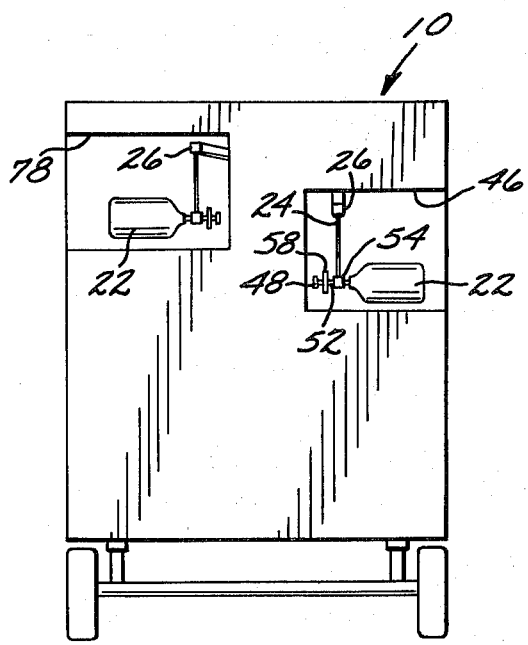
FIG. 6 is a cutaway, diagrammatic end view of the mobile conveyor system of FIGS. 1 and 2.
Figure 5:
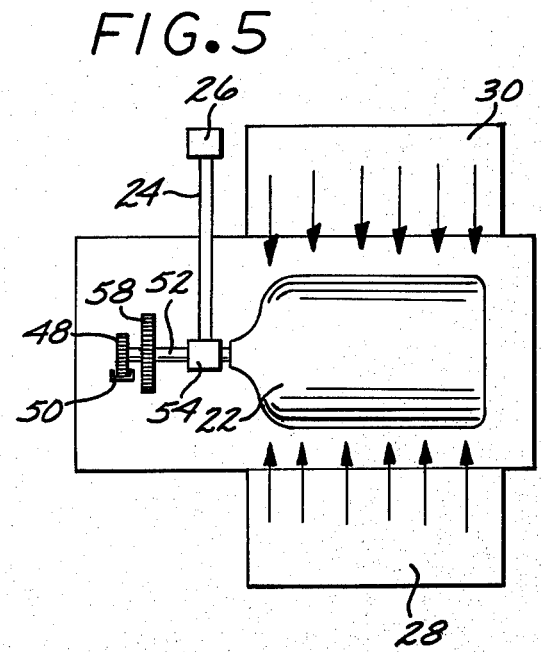
FIG. 5 is a cutaway, diagrammatic end view of the temperature chambers illustrated in FIGS. 3 and 4.

The methodology of the present invention includes a series of steps which control the temperature of a surface of a container having variable thickness such that an appropriate degree of penetration of a solvent, specific to the material of the container, is achieved; and such that the container is uniformly exposed to the solvent with the result that an appropriate skin layer is softened and caused to flow. Scuffs, scratches and other abrasions are smoothed out by the inherent surface tension of the material and coverted into a liquid or semi-liquid state, while the underlying layers of material of the container remain rigid and retain the original structure of the container. The container is then cooled and degassed to remove excess solvent from the skin layer. The result is a blemish-free container with unaltered structural integrity and an unblemished surface.

In addition, the methodology of the present invention includes steps whereby the interior of the container is sealed to prevent exposure to the penetrating solvents, thereby maintaining the interior surface of the container, which contacts consumable fluids or substances stored within the container, free of any contamination solvents.

The apparatus of the present invention includes a mobile, conveyor system in which the above method can be practiced, controlled, and adapted to each specific application, so that large numbers of refurbished containers can be economically recycled at their fill site.

The methodology and apparatus referenced above can best be understood by considering the execution of the methodology in the mobile conveyorized system as illustrated FIGS. 1-7. Referring particularly to FIG. 1, a mobile conveyor system, generally denoted by reference numeral 10, is diagrammatically illustrated in a side cutaway view. Mobile conveyor system 10 is generally comprised of a loading and unloading section 12, extending from an enclosed section, generally denoted by the reference numeral 14. Enclosed section 14 includes, in turn, temperature control section 16, a vapor exposure section 18, and a cooling and return section generally denoted by reference numeral 20.

In brief, a container 22 is manually loaded in loading section 12 by engagement with a holding fixture 24, described in greater detail in connection with FIG. 7. Holding fixture 24 in turn is coupled to a mechanized conveyor track 26, which extends throughout conveyor system 10 and its various sections as just described.

Bottle 22 leaves loading section 12 and enters temperature chamber section 16, and is first subjected to a heating chamber, generally denoted by reference numeral 28, and then subsequently to a cooling chamber, generally denoted by reference numeral 30.

The pre-exposure steps are effected in chambers 28 and 30, wherein each portion of bottle 22 is heated to a selected temperature, and cooled to a range of temperatures, respectively in proportion to the thickness of that portion.

After bottle 22 has achieved an appropriate temperature, it leaves cooling chamber 30 and enters vapor exposure section 18. Conveyor track 26 has a downwardly inclined section 32, which lowers bottle 22 into an enclosure 34 filled with vapors of a solvent specific to the material of which bottle 22 is made. The specific solvent and material of bottle 22 will be described later.

Enclosure 34 includes a reservoir 36, in which the solvent is stored in liquid form. The solvent is boiled from reservoir 36, creating a vapor cloud in region 38 above reservoir 36. Bottle 22 passes on conveyor track 26 through a horizontal section 40, and is uniformly exposed to the vapor cloud by means better described in connection with FIG. 7.

After an appropriate amount of penetration of the solvent into bottle 22 has been achieved, bottle 22 is removed from enclosure 34 by means of an upwardly inclined section 42 of conveyor track 26. Bottle 22 is then completely removed from vapor region 38, which is confined to enclosure 34, and returned via cooling and return section 20 by conveyor track 26 to loading and unloading section 12.

By the time bottle 22 has again reached loading and unloading section 12, the skin layer of bottle 22, which was rendered fluid or semifluid by virtue of its heating and exposure to the solvent vapors, has flowed under its own surface tension to remove all scratches, abrasions and other opacities, thereby leaving a clear, unblemished surface. The solvent, which has penetrated or otherwise attached itself to the skin layer of bottle 22 has evaporated and or been allowed to degass from the skin layer of bottle 22 during the return trip in section 20, to the extent that the skin layer is no longer fluid and has reassumed the ridged, durable condition which normally characterizes it at or near room temperature. The refurbished and recycled bottles emerging from mobile conveyor system 10 are manually unloaded after one pass through the conveyor system and are replaced by blemished bottles yet to processed. Thus, a large number of blemished bottles 22 may be continually processed in a mobile conveyor system 10 of the type diagrammatically illustrated and described in FIGS. 1 and 2.

In the preferred embodiment each of bottles 22 is made of polycarbonate material, for which dichloromethane, also known as methylene chloride, is a specific solvent. However, the scope of the present invention is not restricted to a refurbishing process for polycarbonate water bottles as described here, but extends to other methodologies and systems coming within the scope of the appended claims.

Referring now to FIG. 3, each bottle 22 is coupled to a holding fixture 24 which has one end connected to a conventional conveyor strip 26. The opposing end of holding fixture 24 is rotatably coupled to an internal clamping and sealing mechanism, generally denoted by reference numeral 44, diagrammatically illustrated in FIGS. 3-5 and discussed in detail in connection with FIG. 7.

Referring to FIG. 6, bottle 22 enters mobile conveyor system 10 through an entrance door 46, diagrammatically illustrated in elevational end view as seen through lines 6—6 of FIGS. 1 and 2. Bottle 22 immediately enters heating chamber 28 which may be closed at entrance door 46 by a plurality of hanging drapes (not shown). Holding fixture 24 includes a gear wheel 48, symbolically depicted in FIGS. 3-5, which engages a toothed track 50, which thereby imparts a rotary motion to each bottle 22 as it traverses track 50. As better shown in FIG. 6, each bottle 22 is oriented to substantially lie in a horizontal plane. Therefore, as gear 48 engages track 50, bottle 22 will be rotated about an axial drive rod 52, coupled between gear 48 and interior clamp 44 (not shown in FIG. 6). Axial rod 52, which is rigidly coupled to gear wheel 48, is rotatably journaled to holding fixture 24 by means of a bearing 54. Thus, bottle 22 is suspended by holding fixture 24, and rotates about a horizontal axis, defined through bearing 54.

Referring again to FIG. 3, as bottle 22 traverses heating chamber 28 and is rotated by means of the gear and track combination, it is heated by heated to a uniform temperature air blown through a plurality of louvers 56, which communicate interior 58 of heating chamber 28 with a hot air duct 60. As heated air enters chamber 28, it is directed by means of the plurality of louvers 56 onto the bottles 22, at an angle opposite to the travel of bottles 22 as they are rotated and moved within chamber 28. Heated air is supplied to duct 60 by a conventional means (not shown), which is included within conveyor system 10. Heated air supplied to hot air duct 60 is heated to a temperature sufficent to raise the temperature of bottles 22 to not less than 103° F. The optimum temperature to which bottles 22 should be raised within heating chamber 28 depends upon ambient air temperature and the time required for passage of the bottles 22 from the cooling chamber 30 and the vapor enclosure 34. Even though bottles 22 have a wall thickness varying from 0.05 inches along the side walls to 0.10 inches along the thicker necks and bottom, bottles 22 will be uniformly and completely heated to not less than 103° F. by the time they leave heating chamber 28. In the presently preferred embodiment, the track velocity within mobile conveyor system 10 is 20 feet per minute, and the length of heating chamber 28 is approximately 5 feet.

With continued reference to FIGS. 3 and 4, bottles 22 move from heating chamber 28 to cooling chamber 30, where they are subjected to a controlled amount of cooling according to the present invention. Cooling chamber 30 communicates with a duct 62, coupled to a source of temperature controlled cool air (not shown) included with conveyor system 10. Cool air passes through duct 62 and a plurality of louvers 64 from whence it is directed to bottles 22, then disposed within cooling chamber 30. As before, each bottle continues to rotate by means of the combination of gear wheel 48 and track 50.

During the cooling period, the various bottle portions cool at different rates, according to their masses, the thinner portions of bottles 22 cooling more rapidly than the thicker portions. It has been determined that cooling to a temperature of 75°-80° F. in the chamber 30 is optional for the thinner portions of bottles 22 at which temperature the thicker portions of bottles 22 will be at a temperature of approximately 90°-95°. As will be described later, the desired depth of penetration of the condensing dichloromethane vapors will occur when the bottles have been cooled to this degree just prior to leaving cool chamber 30.

Bottles 22 thus pass through cooling chamber 30, into which ambient temperature air or refrigerated air is directed onto the surfaces of bottles 22. Cooling air enters through louvers 64 at the top of chamber 30 and is directed at an angle generally directed in the same direction of travel of bottles 22 within cooling chamber 30. Bottles 22 continue to be rotated in order to achieve uniform cooling of the surface throughout the approximate 3 foot length of chamber 30.

Referring again to FIG. 2, bottle 22 moves from cooling chamber 30, down conveyor track 26 through inclined portion 32, better shown in FIG. 1, into vapor enclosure 34. As seen in FIG. 2, gear wheel 48 leaves track 50 at end 56 and is disengaged. As holding fixture 24 enters vapor chamber 18, a second gear wheel 58 of larger diameter, shown in end view in FIG. 6 and in top view in FIG. 2, engages a second track 60 in the same manner as gear wheel 48 engages track 50. Due to the larger diameter of gear wheel 58, bottles 22 rotate at a slower angular velocity within vapor chamber 18 than during their traverse through temperature section 16. The more rapid angular rotation of bottles 22 while in temperature section 16 allows for uniform heating and cooling of each of the bottles in preparation for their exposure to the solvent vapor section 18. However, once in vapor section 18, the angular rotation of bottle 22 is slowed to allow better exposure to and penetration of the solvent vapor into the skin layer of bottle 22. In the extreme, a too rapid rotation may tend to unsettle the vapors to the extent of interfering with the uniform and efficient penetration of the condensing solvent vapors.

Gear wheels 58 and 48 also serve as counterweights for the weight of bottle 22, allowing rod 52 to remain substantially horizontal, even in the case where holding fixture 24 is rotatably or loosely suspended from conveyor track 26. In practice, as illustrated in FIG. 6, gear wheels 48 and 58, together will axial rod 52, are slightly heavier than bottle 22 in order to allow for a measure of downward force available for engagine gear 48 and 58 with tracks 50 and 60, respectively. Even when holding fixture 24 is not freely suspended from conveyor track 26, gear wheels 48 and 58 serve to reduce the amount of wear and friction on bearing 54 if the weight of bottle 22 can be approximately balanced.

Referring again to FIGS. 1 and 2, bottles 22 descend portion 32 of track 26 into vapor region 38 of enclosure 34. Reservoir 36 contains a large pool of boiling dichloromethane, held at or slightly above 103° F., which is the approximate boiling point of dichloromethane at sea level. A standing vapor cloud at a temperature of 103° F. thus fills region 38 and tends to form a vapor pool in the lower portion of enclosure 34. In the illustrated embodiment, the top of region 38 is defined by an enclosure cover at level 62. Level 62 is slightly below level 64 which defines the lower edge of the entrance aperture 66 to vapor section 18. The lower surface of the entrance passage into closure 34 may also be provided with a conventional coil or condensor array 68, which serves to condense the warm dichloromethane vapors, which may tend to wash or drift up the passage and might otherwise spill over. Lower surface 72 of the exit passage may similarly be provided with a corresponding condensor 74. Since dichloromethane vapors are substantially heavier than air, and are maintained in region 38 at a vapor temperature which is approximately the boiling point temperature of dichloromethane, they readily condense on cooler surfaces and substantially no leakage occurs from enclosure 34 through entrance aperture 66 or exit aperture 76.

The temperature of the entering surface of the polycarbonate bottle is less than the solvent vapor temperature of 103° having been cooled in the chamber 30. Consequently, the solvent vapors will condense on and penetrate into the bottles' skin layer, thereby softening the polycarbonate to such a degree that it will flow, thereby allowing the surface tension to remove the surface blemishes. Penetration will continue until the vapors heat the polycarbonate bottle to approximately 103° F., at which point no further condensation of solvent on the bottle will occur, and further penetration of solvent into the polycarbonate material ceases. Since the heating step is simply a reversal of the prior cooling step, all portions of the bottle will reach 103° at the same time, that is, after approximately 10 seconds. The differential heating rates of the various portions of the bottle are compensated for by the different threshold temperatures extablished in the cooling step. Consequently, the depth of solvent pentration throughout the bottle exterior surfaces is uniform. If a greater depth of pentration is desired, the prior cooling step should be made longer to increase the time it takes the bottles to reach 103° F. in the heating step.

In the presently preferred embodiment, the conveyor track speed is approximately 20 feet per minute, with each bottle 22 spaced 18 inches apart. The length of vapor section 18 is approximately 12 feet, with incline sections 32 and 42 at approximately 45°, so that bottles 22 are introduced into and removed from the dichloromethane vapors at a vertical rate of about 10 feet per minute. This will prevent distruption of the stable vapor cloud in region 38 of enclosure 34, and still allow container 22 to be exposed to the dichloromethane vapors for more than the desired 10 seconds.

It has been determined according to the present invention that best exposure is obtained within vapor chamber 40 if each bottle 22 is rotated about its axis in a horizontal plane when exposed. That is, the bottom of each bottle 22 and its neck opening will substantially lie in a vertical plane while the bottle is being rotated within the vapors at about 10 RPM. The rate of revolution guarantees that the bottle will be rotated at least once during 10 seconds, which has been found to result in optimally uniform condensed vapor penetration and blemish removal. If the bottle were rotated at a substantially higher rate, aerodynamic phenomena might result in loss of the stability of the vapor cloud which may interfere with uniform condensing vapor penetration if the container were rotated more slowly, some portions may be overexposed while others are relatively underexposed. In addition, if the bottle were oriented within the vapor cloud region 38 other than in the horizontal position, vapors condensing on holding fixture 24 or on the bottle itself may drip or run down the sides of bottle 22, thereby causing a noticeable blemish.

It has further been determined according to the present invention that the exterior surface of bottle 22 must not come in contact with any exterior object during the time in which vapor penetration is occurring or during the curing time following; otherwise, extraneous blemishes will be introduced into the surface. In addition, it is desirable to maintain the interior surfaces of bottle 22 free of any contact with chemicals or solvents. These objects are achieved by the use of an interior clamp, shown in FIG. 7.

Therefore, as bottles 22 are removed through inclined section 42 of enclosure 34, bottles 22 carry little, if any, dichloromethane vapors which have not condensed on or penetrated into bottle 22. As best seen in FIG. 2, bottles 22 are then removed from enclosure 34 and disengaged from track 60. The bottles hang freely without touching any object along their return travel through section 20. By the time bottles exit mobile conveyor system 10 through exit door 78, the surface of the bottle has completely hardened, cooled, is dry of dichloromethane condensation, and is ready for refilling, or is ready for a curing period to allow for complete degassing of any solvent penetration remaining in the skin layer.

Figure 7:
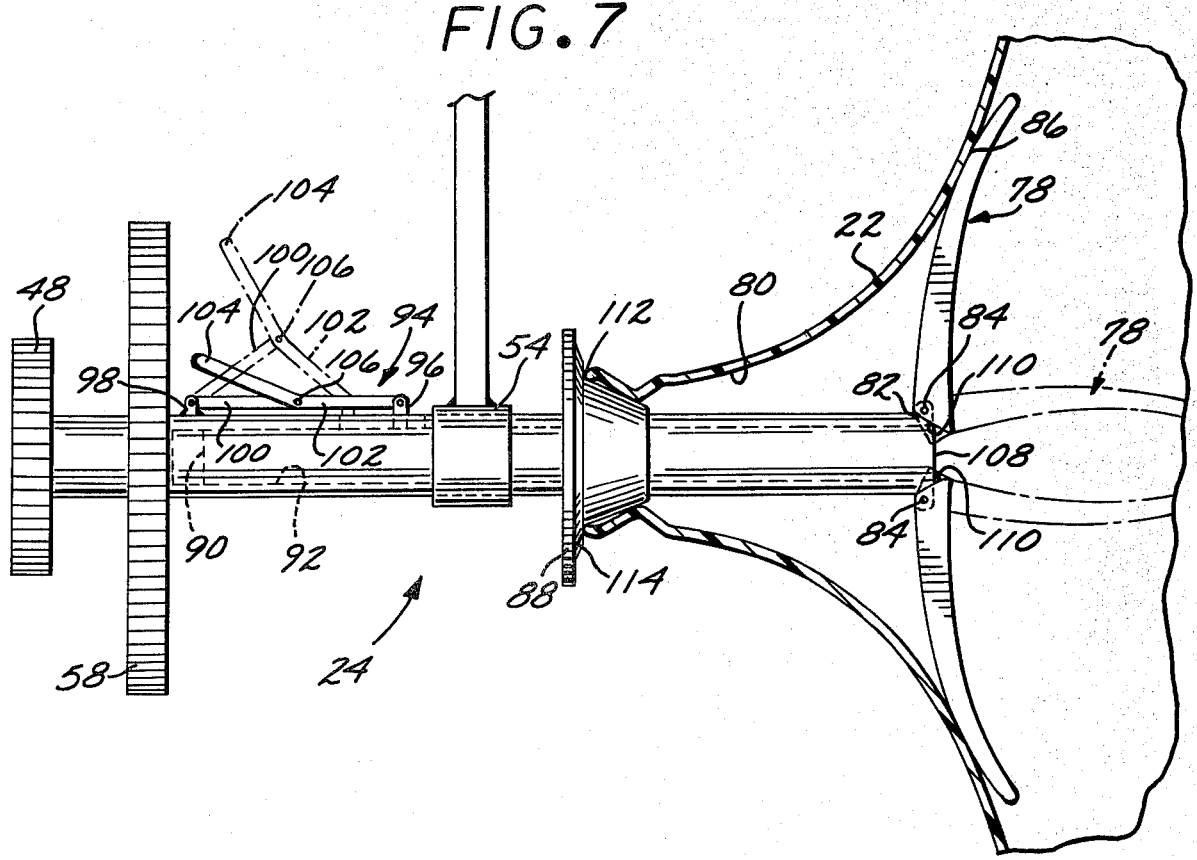
FIG. 7 is a diagrammatic fragmentary view in enlarged scale of a holding fixture of the type used in the conveyor system of FIGS. 1-6, and used for mounting each of the bottles.

Referring now to FIG. 7, the details of holding fixture 24 are seen to include gear wheels 48 and 58 rigidly connected to axial rod 52 at one end, and a plurality of actuating fingers generally denoted by reference numeral 78 rotatably connected to axial rod 52 at the opposing end. The cutaway view of FIG. 7 shows in enlarged scale two such fingers 78, although three or more may be rotatably coupled to axial rod 52 in order to provide a secure and firm clamping action to the interior surface 80 of bottle 22. Each finger 78 is rotatably coupled to end 82 of rod 52 by means of a conventional pivot pin 84. Finger 78 rotates to an extended clamping position, as shown in solid outline in FIG. 7, so that curved surface 86 of finger 78 contacts interior surface 80 of bottle 22 and urges bottle 22 to the left in FIG. 7, toward a sealing collar 88 which is fixed to axial rod 52. Fingers 78 are actuated by means of a rigid plunger 90, slidably contained within an axial bore 92 of rod 52.

Plunger 90 in turn is activted by a self-locking toggle 94, which has one end 96 disposed through a slot 98 defined in rod 52, and fixed to plunger 90. The opposing end of locking toggle 94 is fixed to rod 52 and includes a first arm 100 and second arm 102, illustrated in dotted outline, which are aligned to be parallel in the extended position as shown in solid outline in FIG. 7. When arms 100 and 102 are aligned, plunger 90 is displaced to the right. As handle 104 is lifted, sections 100 and 102 pivot about their rotatable coupling 106, thereby drawing plunger 90 to the left. When plunger 90 is displaced to the right in FIG. 7, its opposing end 108 contacts shoulders 110 of each finger 78. Shoulder 110 serves as a short lever arm on one side of pivot pin 84, while the longer extended side of finger 78 forms the opposing lever arm and contacts surface 80 of bottle 22. As plunger 90 is drawn to the left, finger 78 are free to rotate to the non-clamping position shown in dotted outline in FIG. 7. Fingers 78 may freely rotate under gravity, or may include a conventional spring mechanism (not shown), disposed about pivot pin 84, to automatically return fingers 78 to the unclamped position illustrated in dotted outline.

The combined clamping force provided by fingers 78 and plunger 90 is sufficient to tightly secure neck 112 of bottle 22 to sealing fixture 88, thereby preventing solvent vapors from entering the interior of bottle 22. The sealing function of fixture 88 may be improved by including a soft gasket 114 to enhance the sealing closure between fixture 88 and neck 112 of bottle 22.

Therefore, as bottles 22 are unloaded in section 12, the operator manually lifts handle 104, causing arms 100 and 102 to fold, as shown in dotted outline, bringing fingers 78 to the unclamped position, also shown in dotted outline in FIG. 7. The bottle is then inserted on the unclamped fingers and over end 82 of rod 52. Handle 104 is pressed downward, locking arms 100 and 102 in the extended position, thereby driving plunger 90 to the right, causing fingers 78 to spread outwardly as shown in solid outline, and thereby further pushing bottle 22 to the left against sealing fixture 88, thereby securely coupling bottle 22 to holding fixture 24. Bottle 22 is thus maintained in a horiontal position by fixture 24, rotated by means of gear wheels 48 and 58 coupled to rod 52, and conveyed through mobile conveyor system 10 along track 26. During this conveyance, the exterior surface of bottle 22 is maintained clear of any object which might either contact it or cause condensation to drip or run down upon the exterior surface of bottle 22, either while the vapors are penetrating or while the surface layer is flowing anc curing.

The present invention has been described in connection with a particular illustrated embodiment for the purposes of clairty and example only. The invention should not be taken to be limited by the particular application described above, and it must be understood that the many alterations and modifications and other embodiments may be derived without departing from the spirit and scope of the present invention as set forth in the following claims.

I claim:

1. Method of removing surface blemishes from a container made of polycarbonate material, said method comprising the steps of:
    heating said container to a temperature approximating the vapor temperature of a selected solvent for said platic material;
    subjecting said container to a cooling fluid to cool the external portions of said container to temperatures less than said vapor temperature;
    exposing said external portions of said container to vapors of dichloromethane solvent to heat the exposed surfaces of said container to said vapor temperature, the simultaneous attainment of said vapor temperature by all said exposed surfaces thereby uniformly terminating vapor condensation on and penetration of said exposed surfaces whereby said penetration is of uniform depth throughout said exposed surfaces; and
    removing said container from said vapors and allowing said container to cool.

2. The method of claim 1 wherein said container has a longitudinal, horizontally oriented axis and wherein each step of exposing said container includes rotating said container about said longitudinal axis.

3. The method of claim 1 wherein said heating is by means of a flow of heated air, and wherein each said container within said flow of heated air is rotated to evenly heat said container to not less than 103° F.

4. The method of claim 1 wherein said container is a polycarbonate water bottle, wherein said cooling medium is a flow of cooling air, and wherein each said container is rotated in said flow of cooling air whereby heat is carried away from all exposed surfaces at a substantially uniform rate until the thinnest portions of said bottle reach a temperature of approximately 75° to 80° F., and the thickest portions of said bottle reach a temperature of approximately 90° to 95° F.

5. The method of claim 1 wherein said container is exposed to said vapors for at least ten seconds.

6. The method of claim 2 wherein said container is rotated at a rate of at least 10 revolutions per minute.

7. The method of claim 2 wherein said plastic container is rotated by a fixture located so that vapor condensation on said fixture cannot drip onto said container during said step of exposing said container to said vapors.

8. The method of claim 7 wherein said fixture contacts only the internal surfaces of said container.

9. A method of removing surface blemishes from a polycarbonate bottle comprising the steps of:
    heating said bottle to at least 103° F.;
    subjecting said bottle to a flow of cooling air to carry away heat from the exposed surfaces of said bottle until said surfaces are at temperatures, repsectively, less than 103° F.;
    uniformly exposing said bottle to methylene chloride vapors at approximately 103° F., to heat said exposed surfaces to 103° F., the simultaneous attainment of 103° F. by all said exposed surfaces thereby uniformly terminating vapor condensation on and penetration of said exposed surfaces whereby said penetration is of uniform depth throughout said exposed surfaces; and
    removing said bottle from said vapors allowing said bottle to cool.

10. The method of claim 7 wherein said heating is by means of a flow of heated air, and wherein said cooling air cools the thinner portions of said bottle to approximately 75° F. to 80° F. and the thicker portions of said bottle to approximately 90° F. to 95° F.

11. The method of claim 10 wherein said step of exposing includes rotating said bottle in said vapors about a horizontal axis by means of a fixture making contact only with the internal surfaces of said bottle.

12. the method of claim 11 wherein said step of exposing said bottle to said vapors includes sealing said bottle from said vapors by means of said fixtures so that said vapors are prevented from entering said bottle.

13. A method of removing surface blemishes from a polycarbonate bottle by exposure to dichloromethane vapors comprising the initial heating of all portions of said bottle to at least 103° F., then cooling the bottle to less than 103° F. by flowing cool air uniformly over the bottle to carry away heat from the exposed surfaces whereby the penetration of said vapors into said exposed surfaces during said exposure is terminated simultaneously for all said exposed surfaces by virtue of the simultaneous attainment by all said exposed surfaces of said 103° F. temperature.

* * * * *

UNITED STATES PATENT AND TRADEMARK OFFICE
CERTIFICATE OF CORRECTION

PATENT NO. : 4,478,781
DATED : October 23, 1984
INVENTOR(S) : Arnold E. Zaelke

It is certified that error appears in the above-identified patent and that said Letters Patent is hereby corrected as shown below:

Column 5, line 56, after "leaving" insert -- the --;
Column 6, line 28, delete "engagine" and insert -- engaging --;
Column 7, line 4, after "103°" insert -- F --;
        line 21, delete "distruption" and insert -- disruption --;
Column 9, line 4, delete "anc" and insert -- and --;
        line 7, delete "clairty" and insert -- clarity --;
Column 9, line 20, delete "platic" and insert -- plastic --;
Column 10, line 17, delete "repsectively" and insert -- respectively --;

Signed and Sealed this

Seventh Day of May 1985

[SEAL]

Attest:

DONALD J. QUIGG

Attesting Officer     Acting Commissioner of Patents and Trademarks